UNITED STATES PATENT OFFICE.

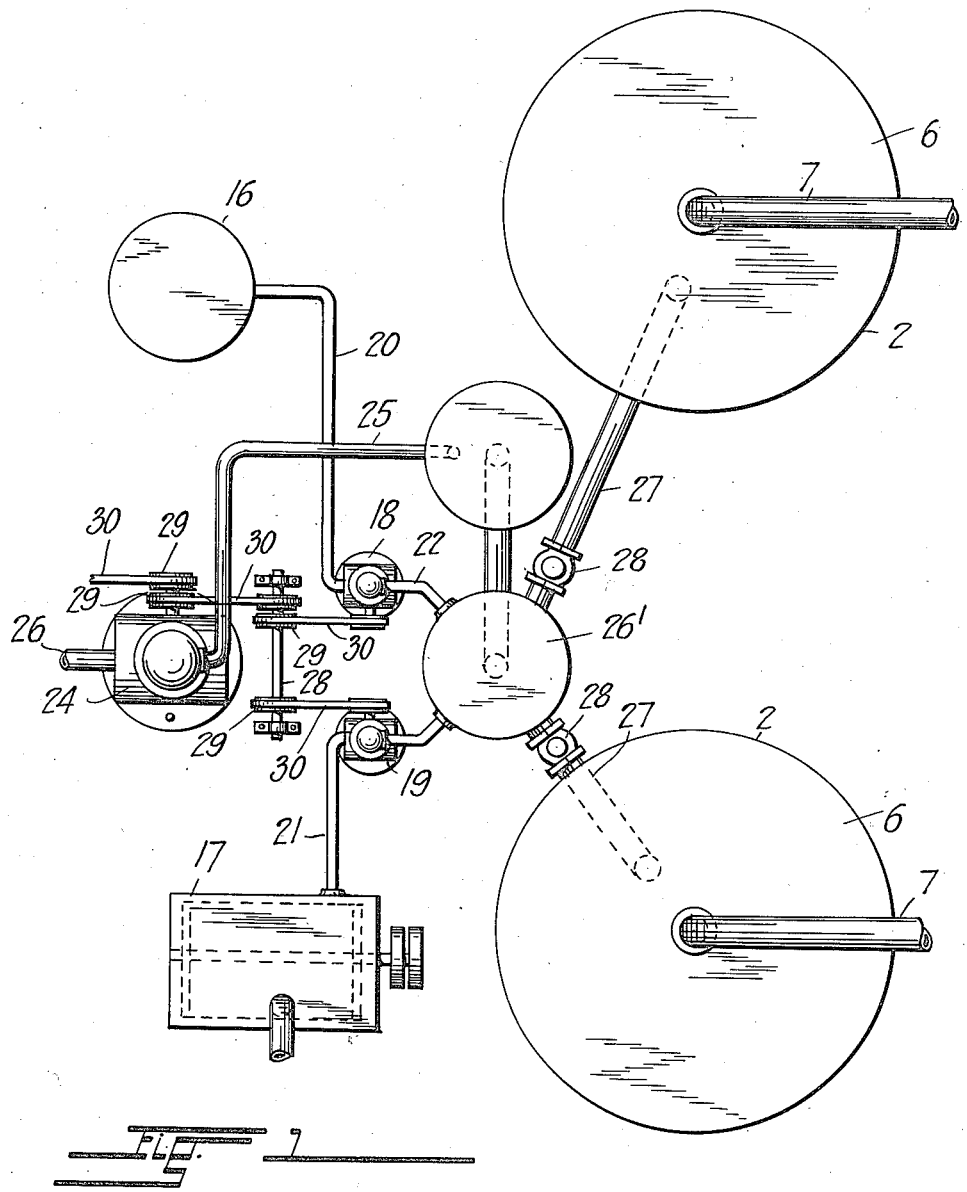

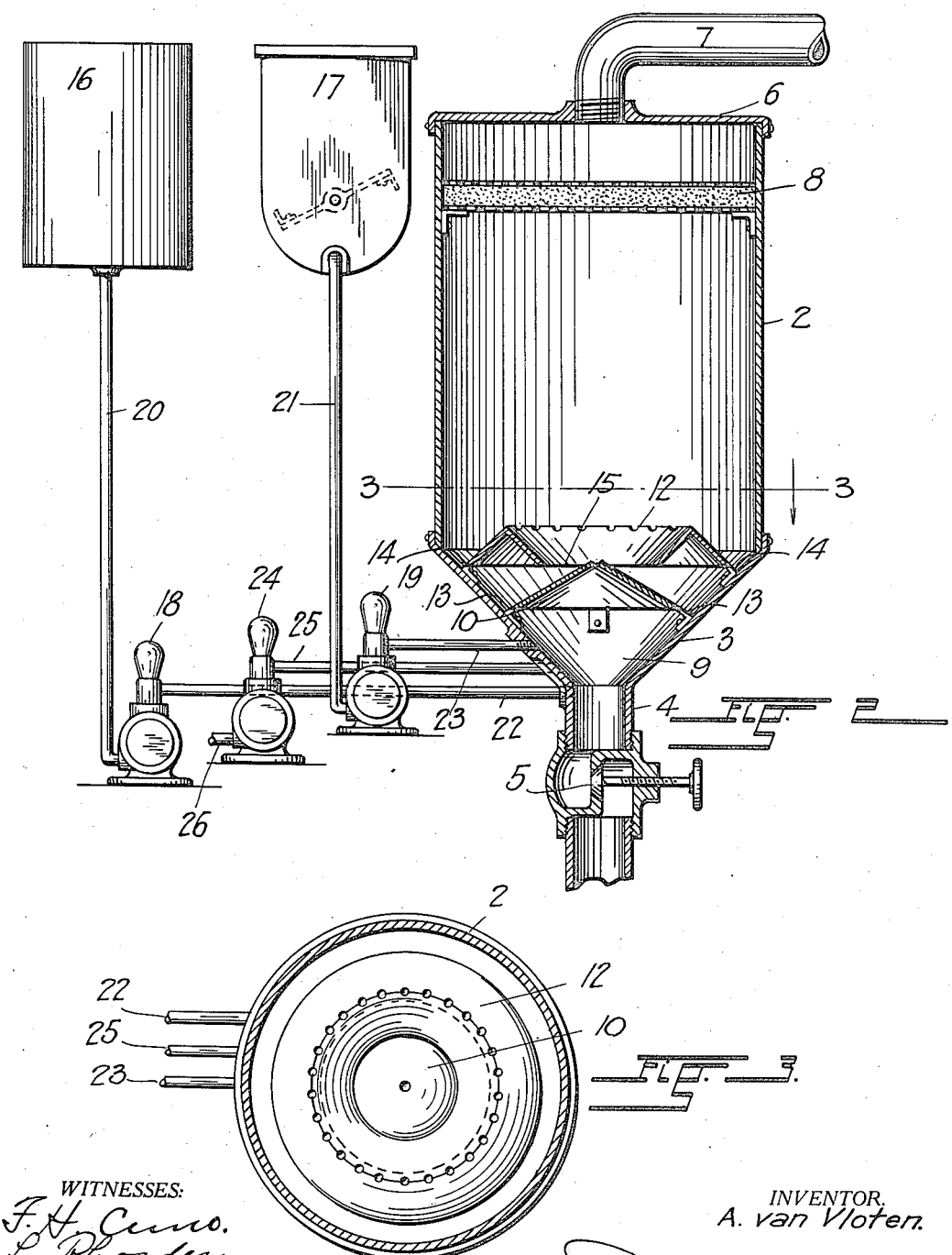

ALLART van VLOTEN, OF DENVER, COLORADO.

WATER-PURIFYING APPARATUS.

1,195,537. Specification of Letters Patent. Patented Aug. 22, 1916.

Application filed June 2, 1915. Serial No. 31,666.

*To all whom it may concern:*

Be it known that I, ALLART VAN VLOTEN, a subject of Wilhelmina, Queen of the Netherlands, having declared my intention to become a citizen of the United States, residing at Denver, in the county of Denver and State of Colorado, have invented certain new and useful Improvements in Water-Purifying Apparatus, of which the following is a specification.

This invention relates to improvements in apparatus used in the process of softening or purifying water by chemical precipitation, and its primary object resides in providing a system of devices which coöperate to purify the water by the action of reagents and circulate the purified water through a distributing system without the use of mechanical agitating or stirring means, appliances for measuring the chemicals, or a special distribution pump.

Another object of my invention resides in improvements in the construction of the precipitation and filtering tank of the system whereby its operation is at once simplified and expedited.

With the above and other objects in view, my invention consists in forcibly introducing the raw water and the chemical reagents, usually lime (CaO) and sal-soda ($NA_2CO_3$), by means of separate, coacting pumps, either into a reaction tank which communicates with one or more precipitation tanks, or directly into one of the latter. The uniform action of the pumps which operate in unison by connection with a common driving medium, causes them to supply the water and the chemicals continuously in predetermined proportions and to thus obviate the use of measuring devices commonly used in systems of this character. The pumps by forcibly introducing the different liquids simultaneously and separately into the reaction tank or into the precipitation tank, produce a vortex and a consequent thorough intermixture of the raw water and the chemicals which renders the employment of mechanical agitating or stirring devices unnecessary. The pumps also operate to force the purified water through the service pipes comprised in the distribution system, and thus perform the function of the distributing pump usually installed between the precipitation tank and the service pipes.

In Figure 1 of the drawings is shown a plan view of the tanks, pumps and conduits comprised in my improved system. Fig. 2 represents a vertical section of the improved precipitation and filtering tank of the system and shows the method by which the raw water and chemicals may be directly introduced thereinto, and Fig. 3, is a section taken along the line 3—3, Fig. 2.

Referring first to Fig. 2 of the drawings, the improved precipitation and filtering tank 2 has a funnel-shaped bottom portion 3 which terminates in a spout 4 the flow through which is controlled by means of a valve 5 of suitable construction. The tank is closed at its top by a cover 6 which has a central outlet for the discharge of the purified water into a pipe 7 of the distribution system. Near the top of the tank is a partition 8 composed of a suitable filtering medium which separates any impurities remaining in the water after the precipitation process, before it is discharged from the tank. The funnel-shaped bottom portion of the tank constitutes a mixing and sediment chamber 9 in which the precipitates collect and which is separated from the upper or body portion of the tank by concentrically disposed baffles 10 and 12. The lowermost baffle 10 is made in the form of a hollow cone the base of which is spaced from the interior surface of the chamber to provide a narrow passage 13 for the up-flowing water, and the other baffle 12 which is annular and concave in section is disposed above the said passage to receive the liquid flowing upwardly therethrough. The upper baffle is spaced from the interior surface of the chamber and the exterior surface of the central cone whereby to provide two passages 14 and 15 through which the water enters the body portion of the tank.

The raw water and chemical reagents are introduced into the sediment chamber either separately or in intermixture and are forced through the mass of sediment collected in the chamber, which forms a very effective natural filter. The impurities contained in the water are by chemical reaction precipitated in the sediment chamber and the water thus softened and purified rises through the passages into the body portion of the tank and after passing through the filter 8, is discharged into the egress pipe 7. The baffles not only retain the water for a sufficient period to complete the precipitation process, but they serve to prevent a too sudden upward flow of water by the difference in temperature of the inflowing and outflowing liquids. The liquid entering the tank at a comparatively high temperature collects in the central baffle 10 in which it is retained and consequently cooled before it is forced outwardly and upwardly through the passage 13. After leaving this passage the flow of the water is again interrupted by the second baffle in which the cooling process is continued, with the result that when the liquid enters the body of water in the upper portion of the tank through the passages 14 and 15, it is evenly distributed and rises with the same at a uniform velocity. The formation of a rapidly rising current of water is thus prevented and all the water entering the sediment chamber is retained a period sufficient for the complete precipitation of its impurities by chemical reaction, irrespective of the temperature at which it is supplied.

The precipitates accumulating in the settling chamber are removed from time to time by opening the valve 5 in the outlet pipe 4 and the baffles have in their upper surfaces apertures for the escape of air.

In the system shown in Fig. 2 the reference numeral 16 designates the sal-soda supply tank, and 17 the tank containing the lime.

The chemical solutions are drawn from the tanks and forced into the sediment chamber of the precipitation tank by means of pumps 18 and 19, the intake and outlet ports of which are respectively connected with the tanks 16, 17 and 2 by means of pipes 21, 22 and 23. A third pump 24 which is connected with the precipitation tank by means of a pipe 25 is provided to draw the water from a source of supply through an intake pipe 26. It will be readily seen that the three liquids being thus forcibly introduced into the settling chamber in separate streams, must necessarily produce a vortex which effects a thorough intermixture of the water with the solutions of the reagents and thus expedites the process of precipitation.

In the system illustrated in Fig. 1, the pumps deliver the water and chemicals into a reaction tank 26' in which they are mixed by the above described method before entering the precipitation tank. The principal object of this modification in my system is to permit the use of two precipitation tanks which may be cleaned separately without interfering with the flow of water through the system. With this object in view, the reaction tank is connected with two precipitation tanks by means of pipes 27 the flow of liquid through which can be discontinued by the adjustment of valves 28.

In the operation of the system, one of these valves is closed while the other is open and to clean the tank which is in operation, it is but necessary to reverse the position of the two valves 28.

Fig. 2 also shows the connection of the three pumps with a driving medium through the intermediary of a line shaft 28, pulleys 29, and belts 30 whereby they are compelled to move synchronously at predetermined velocities which are in ratio to the capacities of the pumps and the quantities of chemicals required for the complete precipitation of the impurities in a determinate amount of water.

Having thus described the construction and arrangement of my improved apparatus for softening and purifying water, it will be readily understood that the same may be used with equal results for the purification of any other liquid which requires precipitation by means of chemical reagents, and that if the apparatus is used in a hot water system, the water may be heated before entering the precipitation and filtering tank.

The pumps which measure the liquids and effect their thorough intermixture also force the purified water through the service pipes of the system and they thus take the place of the mechanical stirring and measuring devices and the distribution pump usually included in systems of the character to which my invention appertains.

Having thus described my invention what I claim and desire to secure by Letters-Patent is:

1. In apparatus for the purification of water, a precipitation tank having at its bottom, a mixing chamber and above said chamber, a hollow cone spaced from the interior surface of the tank to provide a restricted passage for the upflowing liquid, a concave annulus spaced from the interior surface of the tank above the cone, and means for introducing into the mixing chamber chemical reagents and water under treatment.

2. In apparatus for the purification of water, a precipitation tank having at its bottom, a mixing chamber and above said chamber, a hollow cone spaced from the interior surface of the tank to provide a restricted passage for the upflowing liquid, a concave annulus spaced from the interior surface of the tank and the exterior surface of the cone, and means for introducing into the mixing chamber chemical reagents and water under treatment.

3. Apparatus for the purification of water comprising a precipitation tank having in its top an outlet for pure liquid under pressure, a baffle providing a cone-shaped pocket for the retention of upwardly flowing fluid, and spaced at its edge from the inner surface of the tank, a second baffle providing an annular pocket for the retention of up-flowing fluid, above the said space, said baffles coöperating to divide said tank into an upper or settling compartment and a shallow lower or mixing compartment communicating by a narrow passage, and devices for the supply of fluids under pressure, connected with said lower compartment at juxtaposed points whereby to effect within the compartment the intermixture of injected fluids.

In testimony whereof I have affixed my signature in presence of a witness.

ALLART van VLOTEN.

Witness:
G. J. ROLLANDET.